United States Patent [19]
Jackson

[11] 3,778,703

[45] Dec. 11, 1973

[54] APPARATUS FOR DETECTING UNLEVELNESS OF A PENDULOUSLY SUPPORTED FLUX VALVE BY SUBJECTING THE VALVE TO A VERTICAL MAGNETIC FIELD

[75] Inventor: John R. Jackson, Phoenix, Ariz.

[73] Assignee: Sperry Rand Corporation, New York, N.Y.

[22] Filed: Dec. 20, 1971

[21] Appl. No.: 209,848

[52] U.S. Cl. .................. 324/43 R, 33/361, 73/1 E
[51] Int. Cl. ............................................. G01r 33/02
[58] Field of Search .......................... 324/43 R, 47; 33/355, 356, 360, 361; 73/1 E

[56] References Cited
UNITED STATES PATENTS
2,887,873  5/1959  Halpern et al. ........................... 73/1

*Primary Examiner*—Robert J. Corcoran
*Attorney*—Howard P. Terry

[57] ABSTRACT

A pendulously mounted flux valve is tested for levelness by applying a vertically oriented alternating magnetic field across the flux valve. The pickup windings on the flux valve are connected to corresponding primary windings in a transolver. The rotor of the transolver is locked in alignment with the flux valve so as to produce quadrature voltages having relative magnitudes representative of any flux valve output voltages with respect to one axis of the valve. The voltages from the transolver are passed through individual signal processors each containing a filter that passes only those signals arising from the applied alternating magnetic field and a phase sensitive demodulator. The demodulator outputs are applied to the deflection plates of a cathode ray tube so as to produce a Lissajou figure consisting of a radial line having a magnitude indicative of the amount by which the plane of the flux valve is inclined with respect to the horizontal and an orientation indicative of the direction of the inclination.

6 Claims, 2 Drawing Figures

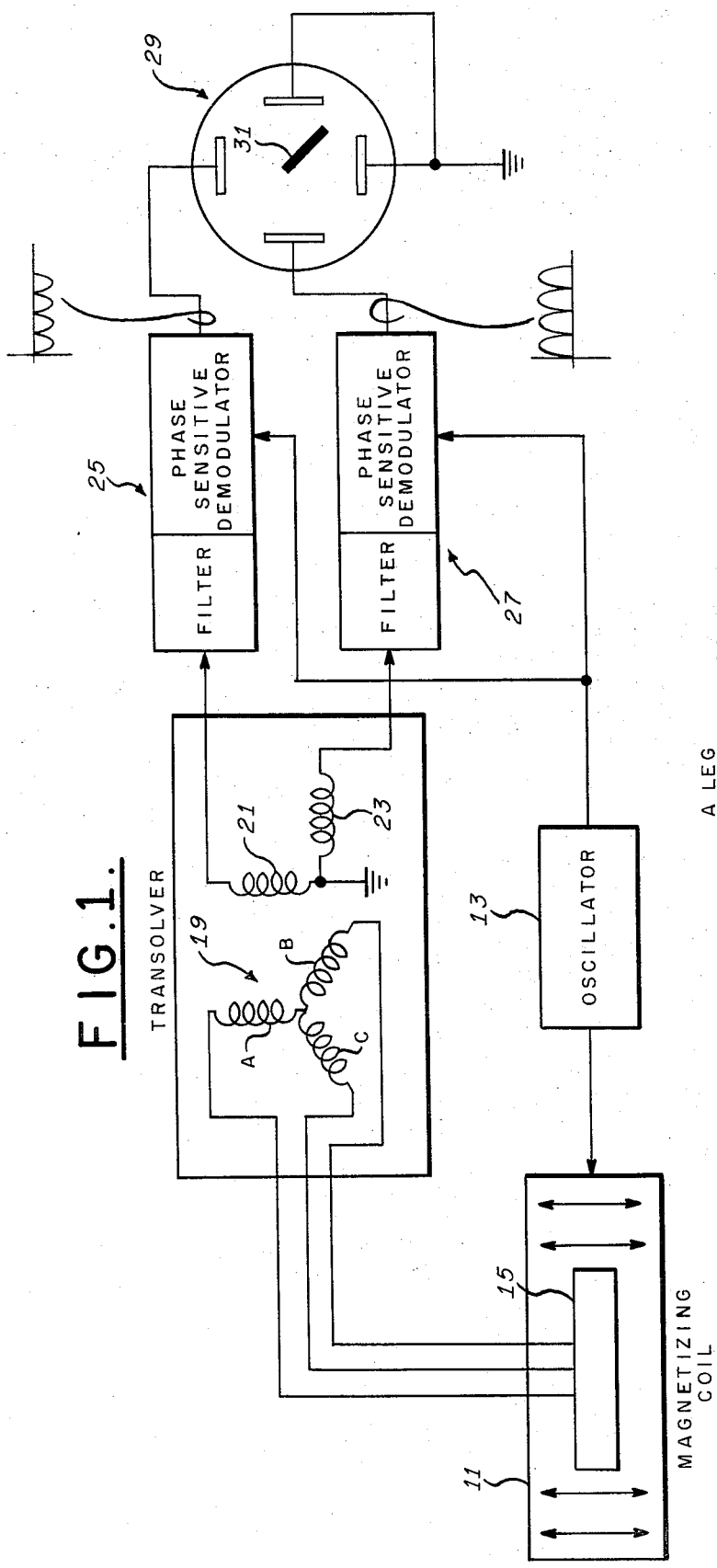

APPARATUS FOR DETECTING UNLEVELNESS OF A PENDULOUSLY SUPPORTED FLUX VALVE BY SUBJECTING THE VALVE TO A VERTICAL MAGNETIC FIELD

BACKGROUND OF THE INVENTION

1. Field of the Invention

This invention relates to flux valves and more specifically to test apparatus useful in the calibration of such valves.

2. Description of the Prior Art

Flux valves are well known devices and are frequently used in aircraft navigation equipment. Basically, a flux valve consists of a spider-like core of laminated metal of high permeability. The magnetic core of a typical flux valve contains three nominally horizontal arms arrayed at 120° angles with respect to each other. Changes in the direction of the earth's magnetic flux in the plane of the core causes changes in the distribution of the flux in the individual legs of the core. The resulting change in permeability of the magnetic core material is sensed by auxiliary circuits and used to indicate the direction of the earth's field.

Since the horizontal component of the earth's magnetic field contains the directional information, a conventional flux valve is suspended pendulously to prevent the sensing element from detecting any component of the vertical field. The single cycle nature of the heading errors produced by an "unlevel" flux valve are indistinguishable from the single cycle errors produced by adjacent hard iron and permanently magnetized members except for the fact that the magnitude of the "unlevelness" errors are proportional to vertical field strength. This characteristic makes it impractical to compensate for such errors, so that the center of gravity of the mechanical pendulum must be adjusted to align the plane of the electrical sensing element perpendicular to the gravity vector.

Prior art methods for determining such flux valve inclination or "unlevelness" involve techniques wherein the flux valve is rotated to known azimuth headings on a precise turntable, and the errors at each heading caused by vertical components of the earth's field are resolved by using a nomograph to determine the magnitude and direction of the inclination. Such methods, however, are laborious and time consuming. Use of the present invention permits more accurate results to be achieved with a considerable reduction, not only in test time, but also with less specialized test equipment.

SUMMARY OF THE INVENTION

The present invention provides means for achieving balance in a pendulously supported flux valve by subjecting the valve to a known, vertically oriented alternating magnetic field, detecting the resultant signals induced in each leg of the flux valve, resolving these signals into quadrature components having a known orientation with respect to the legs of the flux valve, and displaying these components on a graphical display device so as to indicate directly the position and relative magnitude of any mechanical imbalance that must be corrected.

BRIEF DESCRIPTION OF THE DRAWINGS

FIG. 1 is a block diagram illustrating the arrangement of components useful in practicing the invention; and FIG. 2 is a diagram illustrating one form of display for use with the invention.

DESCRIPTION OF THE PREFERRED EMBODIMENT

The apparatus of the present invention performs two primary functions: The detection of single cycle errors in a flux valve under test which are caused by unlevelness, and the display of such information so as to apprise the operator of the required magnitude and direction of change necessary to adjust the center of gravity of the pendulous mass so as to restore the flux valve to a horizontal position.

Referring to FIG. 1, a magnetizing coil 11 is excited from an oscillator 13. The coil contains a number of turns having a diameter sufficiently large to enclose the flux valve 15 under test. The coil is designed to produce an alternating magnetic field in which the flux lines are vertically oriented in the region of the flux valve.

Single cycle errors caused by "unlevelness" are ordinarily indistinguishable from the single cycle errors caused by permanently magnetized elements inside the flux valve and by large amounts of magnetized hard iron that may be located in close proximity to the flux valve so long as the vertical magnetic field strength remains constant. The alternating magnetic field applied to the flux valve in accordance with the principles of the present invention provides a means of separating the unlevelness errors from the other cyclic errors in the output of the flux valve. The frequency of the alternating magnetic field must, however, be quite low in relation to the normal output frequency of the flux valve signal. In a typical flux valve, the signal frequency is 800 Hertz, and during a one cycle period, i.e., 1/800th seconds, the magnetic field seen by the flux valve should remain essentially constant. However, when the particular application requires the use of a visual display of the results, the frequency of the alternating magnetic field should be high enough to provide a continuous and jitter-free presentation on the cathode ray tube. A frequency of 60 Hertz has been found satisfactory for this purpose.

By way of example, consider a flux valve of the type employing three radial arms. The pickup coil on each arm is connected to a corresponding leg on the primary winding of a transolver 17 designated as legs A, B and C for convenience. The transolver is a well known device employing the aforementioned primary winding 19 wound on a stator core and a rotor core contain-ing a pair of secondary coils 21 and 23 wound in space quadrature.

As is known in the art, the rotors of such transolvers may be mechanically locked in position, whereupon the voltages induced in the secondary coils represent a pair of quadrature voltages having magnitudes representative of the sine and cosine, respectively, of the voltages applied to the primary windings of the transolver.

In accordance with the principles of the invention, the quadrature voltages from the transolver are applied to a pair of signal processors 25 and 27. The signal processors each contain a bandpass filter adjusted to pass only the signals corresponding in frequency to the signals induced in the pickup windings of the flux valve under test by the magnetic field arising from the magnetizing coil 11.

The bandpass filters, which may conveniently take the form of bandpass amplifiers, are used primarily as rejection filters to exclude the effects of steady state magnetic fields and extraneous fields varying at frequencies other than the oscillator frequency. This removes from the flux valve output such extraneous signals as those caused by the earth's ambient field and similar signals caused by nearby magnetic material such as material on the person of the operator.

Each signal processor also contains a conventional phase sensitive demodulator which accepts signals from the corresponding filter.

Phase sensitive demodulators are well known devices that compare input signals with a reference signal and provide an output having a magnitude indicative of the magnitude of the input signal and a polarity dependent on whether the input signal is in phase or out of phase with the reference signal.

In the present invention, the rotor of the transolver is locked so that the secondary winding is oriented in a known position with respect to the individual legs of the flux valve. A signal from the oscillator 13 is used as a reference voltage. Quadrature components from the transolver are filtered in the corresponding signal processors and compared with the phase of the oscillator output signal. If the plane of the flux valve is horizontal and therefore normal to the magnetic flux produced by the magnetizing coil, the system is in balance and no quadrature components are produced. Under these conditions, there is no output signal from either of the signal processors. If, however, the plane of the flux valve is not horizontal, the alternating magnetic field from the magnetizing coil 11 will induce net voltages in the pickup windings on the flux valve. These induced voltages will be at the frequency of the oscillator and will have comparative magnitudes which are a function of the degree and direction of inclination of the flux valve.

When the resulting signals from an unlevel flux valve are applied to the signal processors, an output signal will be derived from each signal processor resembling a full wave rectified voltage having a magnitude indicative of the degree of inclination along the corresponding axis and a polarity indicative of the sense of such inclination along the same axis.

The voltages from the signal processors are applied to the vertical and horizontal deflection plates, respectively, of a cathode ray tube 29.

If the flux valve under test is not level, corresponding deflection voltages will be applied to the deflection plates of the cathode ray tube and a Lissajou figure 31 will be produced. The Lissajou figure will appear as a radial line having a length and direction representative of the vector sum of the two voltages produced by the transolver.

Conveniently, the cathode ray tube and the rotor of the transolver may be positioned so that a vertical Lissajou figure originating at the center of the cathode ray tube and directed upwardly may represent an inclination along a specified axis such as leg A of the flux valve. Thus the angular displacement from a vertically upward direction will indicate the point on the perimeter of the flux valve at which an adjustment must be made in order to re-align the flux valve. The length of the Lissajou figure then indicates the mass which must be removed or added to balance the flux valve so as to achieve equipoise.

The apparatus of the present invention provides an instantaneous indication of the presence of an "unlevelness" error as well as a continuous indication of any changes made during the calibration process. The display allows the operator to determine rapidly and accurately the magnitude and angular position of the error, and instantaneously to determine the position on the flux valve where an adjustment must be made to relocate the center of gravity of the pendulous mass.

FIG. 2 indicates the manner in which a display device, such as the cathode ray tube 29, may be supplied with indices to facilitate testing. Assuming that flux valves to be tested contain three radial legs, the outer portion of the tube face may be supplied with indices corresponding to the A, B and C legs, respectively. Thus, angular measurements may be taken directly from the tube face.

Similarly, a circular index or "tolerance ring" 33 may be applied to the tube face. The radius of the circular index may then be chosen such that a radial Lissajou figure 35 within the circular index will indicate that the flux valve under test is within tolerance, whereas a Lissajou figure 37 extending beyond the circular index will indicate that the flux valve under test requires a mass adjustment. The peripheral indices may then conveniently be used to locate any required mass adjustment with respect to an identified leg of the flux valve.

Although the output voltages from the phase sensitive demodulators shown in FIG. 1 have been indicated as unfiltered pulse trains, it will be appreciated that these voltages may be filtered if desired to produce steady voltages having magnitudes indicative of the "unlevelness" in the flux valve.

The waveshapes indicated in FIG. 1 create the display consisting of a radial line as indicated in the figures. If the output signals from the demodulators are filtered to give a smooth d.c. signal, the display will be a single dot which occupies a position on the screen in accordance with the "unlevel-ness." With such a single dot display, the angle of rotation must be computed from an imaginary center point and the magnitude of the error must be computed by measuring the distance between the dot and the imaginary center point of the display.

While the invention has been described in its preferred embodiment, it is to be understood that the words which have been used are words of description rather than limitation and that changes within the purview of the appended claims may be made without departing from the true scope and spirit of the invention in its broader aspects.

I claim:

1. Apparatus for detecting unlevelness in a pendulously supported flux valve comprising a source of alternating current signals, means to apply a vertically oriented alternating magnetic field across said flux valve in response to said alternating current signals, means to receive voltages induced in each leg of the flux valve by said alternating magnetic field, means to resolve said induced voltages into quadrature components having a predetermined orientation with respect to said flux valve, means to provide output signals indicative of the magnitude and phase of each quadrature component with respect to said alternating current signals, and means for graphically displaying said output signals.

2. The apparatus of claim 1 wherein the means to apply the magnetic field is a cylindrical coil adjusted to encircle a flux valve to be tested and positioned with its axis vertical.

3. The apparatus of claim 2 wherein the flux valve to be tested is of the type containing a plurality of radially disposed nominally horizontal arms each containing a pickup coil, and the means to resolve said induced voltages is a transolver having individual primary windings corresponding to each pickup coil in the flux valve to be tested, said primary windings being spatially arranged to correspond to the pickup windings on said flux valve, said transolver further containing a pair of secondary windings arranged in space quadrature and positioned so that the axis of one secondary winding is aligned with the axis of a designated primary winding.

4. The apparatus of claim 3 wherein the means to provide output signals includes individual signal processors for each of said quadrature components, each of said signal processors containing a phase sensitive demodulator connected to receive reference signals from said source of alternating current whereby each phase sensitive demodulator produces an output signal having a polarity representative of the phase relationship of the corresponding quadrature component with respect to the alternating current from said source and a magnitude indicative of the magnitude of the corresponding quadrature component.

5. The apparatus of claim 4 wherein the graphical display means is a cathode ray tube having vertical and horizontal deflection plates connected to receive the output signals from the first and second phase sensitive demodulators, respectively.

6. The apparatus of claim 5 wherein each signal processor contains an input filter constructed to accept only quadrature components having a frequency substantially equal to that of said alternating current signals.

* * * * *